United States Patent
Langel

(10) Patent No.: US 9,088,150 B2
(45) Date of Patent: Jul. 21, 2015

(54) OVERVOLTAGE CLIPPING DEVICE FOR A WIND TURBINE AND METHOD

(75) Inventor: Andre Langel, Stadtlohn (DE)

(73) Assignee: General Electric Company, Schenectady, NY (US)

( * ) Notice: Subject to any disclaimer, the term of this patent is extended or adjusted under 35 U.S.C. 154(b) by 584 days.

(21) Appl. No.: 13/412,662

(22) Filed: Mar. 6, 2012

(65) Prior Publication Data

US 2013/0234434 A1 Sep. 12, 2013

(51) Int. Cl.
| | |
|---|---|
| H02P 9/00 | (2006.01) |
| H02H 3/20 | (2006.01) |
| H02H 3/00 | (2006.01) |
| H02P 101/15 | (2015.01) |

(52) U.S. Cl.
CPC ............... *H02H 3/003* (2013.01); *H02P 9/007* (2013.01); *H02H 3/20* (2013.01); *H02P 2101/15* (2015.01)

(58) Field of Classification Search
CPC ..... H02P 9/007; H02P 2101/15; H02H 3/003; H02H 3/20
USPC ....................................................... 361/91.1
See application file for complete search history.

(56) References Cited

U.S. PATENT DOCUMENTS

| | | | | |
|---|---|---|---|---|
| 5,493,469 | A | * | 2/1996 | Lace .............................. 361/119 |
| 5,621,599 | A | * | 4/1997 | Larsen et al. .................... 361/56 |
| 6,741,612 | B1 | * | 5/2004 | Butler et al. ................... 370/501 |
| 8,467,163 | B2 | * | 6/2013 | Asplund ......................... 361/56 |
| 2005/0259373 | A1 | * | 11/2005 | Hoopes ........................... 361/90 |
| 2010/0195256 | A1 | * | 8/2010 | Birnbach ........................ 361/56 |
| 2013/0169068 | A1 | * | 7/2013 | Wagoner et al. .............. 307/126 |

FOREIGN PATENT DOCUMENTS

WO WO 2011023238 A1 * 3/2011

* cited by examiner

*Primary Examiner* — Thienvu Tran
*Assistant Examiner* — Kevin J Comber
(74) *Attorney, Agent, or Firm* — Global Patent Operation; Douglas D. Zhang

(57) ABSTRACT

An overvoltage clipping device for clipping an overvoltage occurring at a main transformer of a wind turbine is provided. The overvoltage clipping device includes a detection unit for detecting an actual voltage level at the main transformer. The determination unit which is operatively connected to the detection unit determines whether the actual voltage level is above a predetermined reference voltage level. At least one switching unit is provided which is operatively connected to the determination unit for electrically coupling at least two transformer terminals of the main transformer. The control unit drives the switching unit if the detected actual voltage level is above the predetermined reference voltage level such that the at least two transformer terminals are electrically coupled to each other by the switching unit.

20 Claims, 7 Drawing Sheets

OVERVOLTAGE CLIPPING DEVICE FOR A WIND TURBINE AND METHOD

BACKGROUND OF THE INVENTION

The subject matter described herein relates generally to methods and systems for wind energy production, and more particularly, to an overvoltage clipping device and a method for protecting a wind turbine connected to a utility grid from overvoltage.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with predefined rated power limits. To operate within such rated power limits, the electrical and/or mechanical components may be operated with large margins for the operating limitations. Such operation may result in inefficient wind turbine operation, and a capability of the wind turbine may be underutilized.

When a wind turbine is connected to an electrical utility grid, voltage variations of the grid may have an influence on electrical components installed at the wind turbine. In particular, overvoltage events occurring in the utility grid may be an issue for electrical wind turbine components. Electrical wind turbine components may have specific voltage ratings which are lower than voltage levels present during overvoltage events in the grid. Thus, there is a risk that electrical and or electronic components such as power electronics may be damaged. It is thus desirable to keep the voltage level in a range which is not harmful for electrical and/or auxiliary wind turbine components.

BRIEF DESCRIPTION OF THE INVENTION

In one aspect, an overvoltage clipping device for clipping an overvoltage occurring at a main transformer of a wind turbine is provided. The overvoltage clipping device includes a detection unit for detecting an actual voltage level at the main transformer; a determination unit operatively connected to the detection unit for determining whether the detected actual voltage level is above a predetermined reference voltage level; at least one switching unit operatively connected to the determination unit for electrically coupling at least two transformer terminals of the main transformer; and a control unit for driving the switching unit if the detected actual voltage level is above the predetermined reference voltage level, such that the at least two transformer terminals are electrically coupled to each other by the switching unit.

In another aspect, a wind turbine is provided, including a main transformer connected to a utility grid; and an overvoltage clipping device for clipping an overvoltage occurring at the main transformer. The overvoltage clipping device includes a detection unit for detecting an actual voltage level at the main transformer; a determination unit operatively connected to the detection unit for determining whether the actual voltage level is above a predetermined reference voltage level; at least one switching unit operatively connected to the determination unit for electrically coupling at least two transformer terminals of the main transformer; and a control unit for driving the switching unit if the detected actual voltage level is above the predetermined reference voltage level, such that the at least two transformer terminals are electrically coupled to each other by the switching unit.

In yet another aspect, a method for protecting a wind turbine connected to a utility grid via a main transformer against overvoltage is provided. The method includes connecting a switching unit between at least two transformer terminals of the main transformer; measuring an actual voltage level at the main transformer; determining whether the actual voltage level is above a predetermined reference voltage level; and operating the switching unit if the detected actual voltage level is above the predetermined reference voltage level, such that the at least two transformer terminals are electrically coupled to each other by the switching unit.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system that provides clipping of overvoltages which may occur in an electrical utility grid to which the wind turbine is connected. More specifically, an overvoltage clipping device is provided which may be used for protecting the wind turbine from overvoltage events. It is thus possible to provide a voltage level in a range which is not harmful for electrical and/or auxiliary wind turbine components even though overvoltage may be present at the electrical utility grid to which the wind turbine is connected. Installing wind turbine may include meeting a variety of grid codes. Some of these grid codes may include overvoltage specification of up to 180% of a nominal voltage for several milliseconds. Thus, there is a risk that electrical and or electronic components and other electrically sensitive systems such as power electronics may be damaged. It is thus desirable to keep the voltage level in a range which is not harmful for electrical and/or auxiliary wind turbine components As used herein, the term "overvoltage" is intended to be representative of a voltage level which exceeds a predetermined voltages level such as a reference voltage level. This reference voltage level may be set according to maximum voltage level which may be applied at electrical and/or auxiliary components of the wind turbine. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
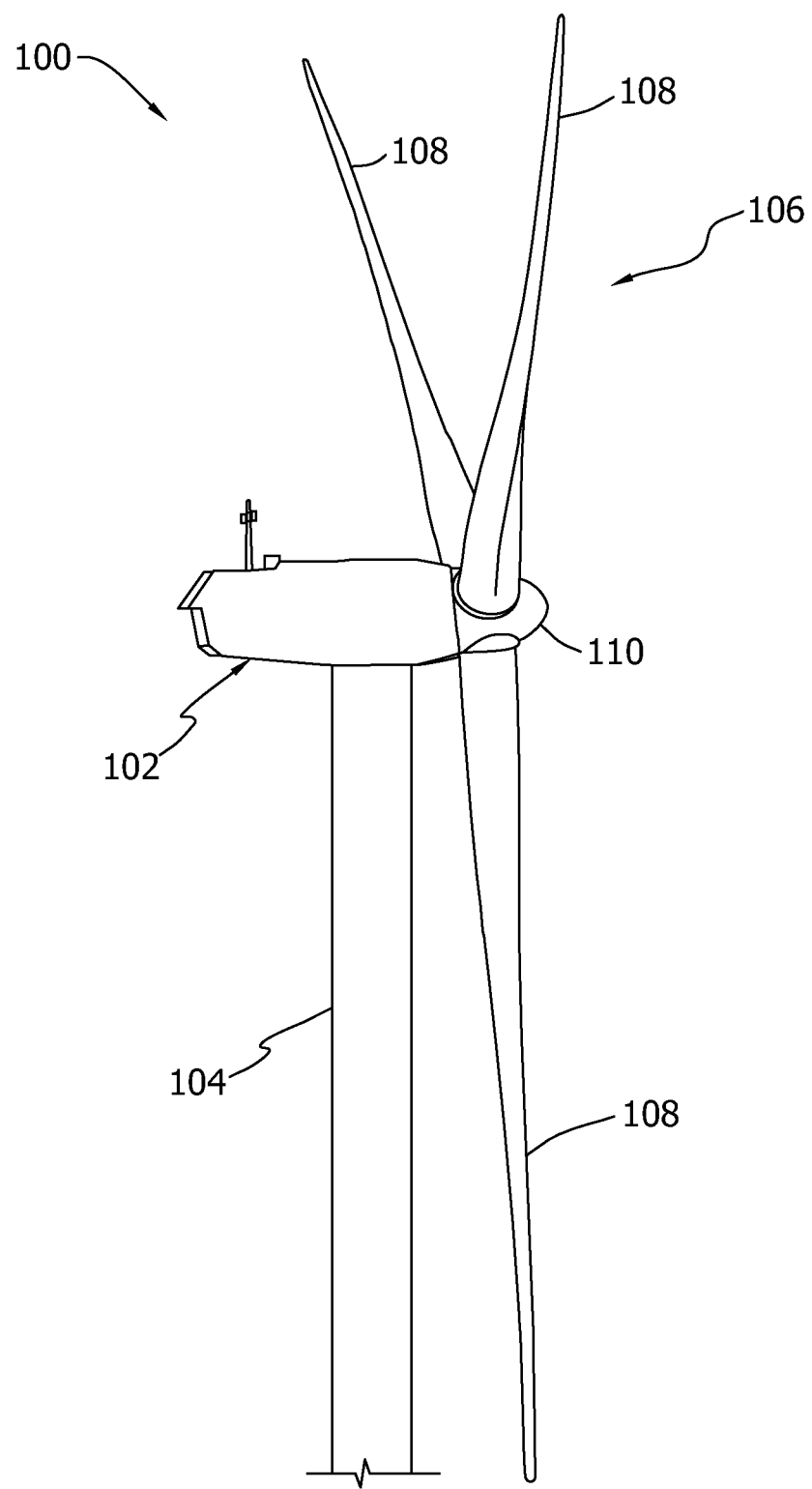
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
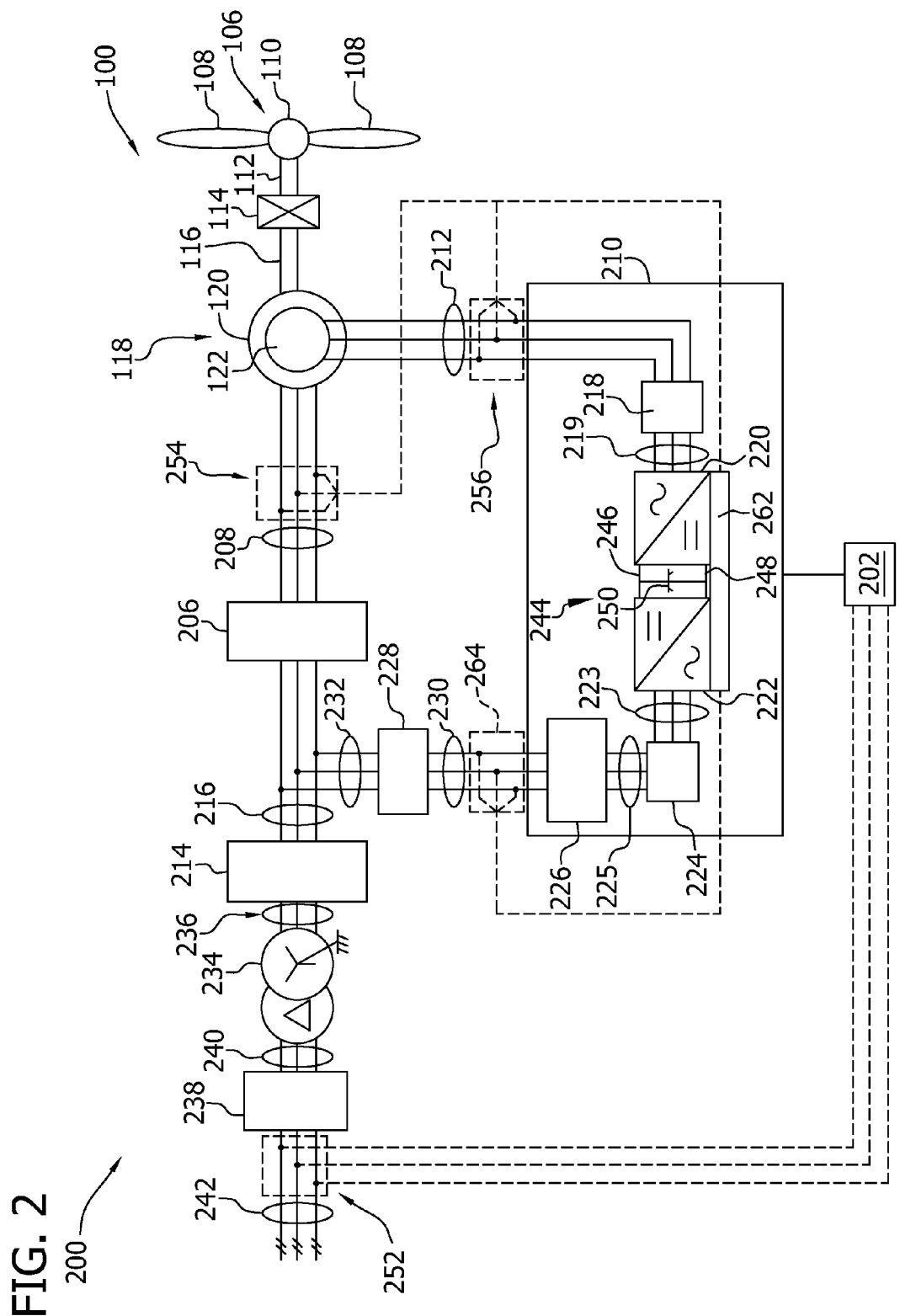
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings. Moreover, generator 118 may be provided as an electrically excited synchronous motor.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with predetermined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with predetermined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
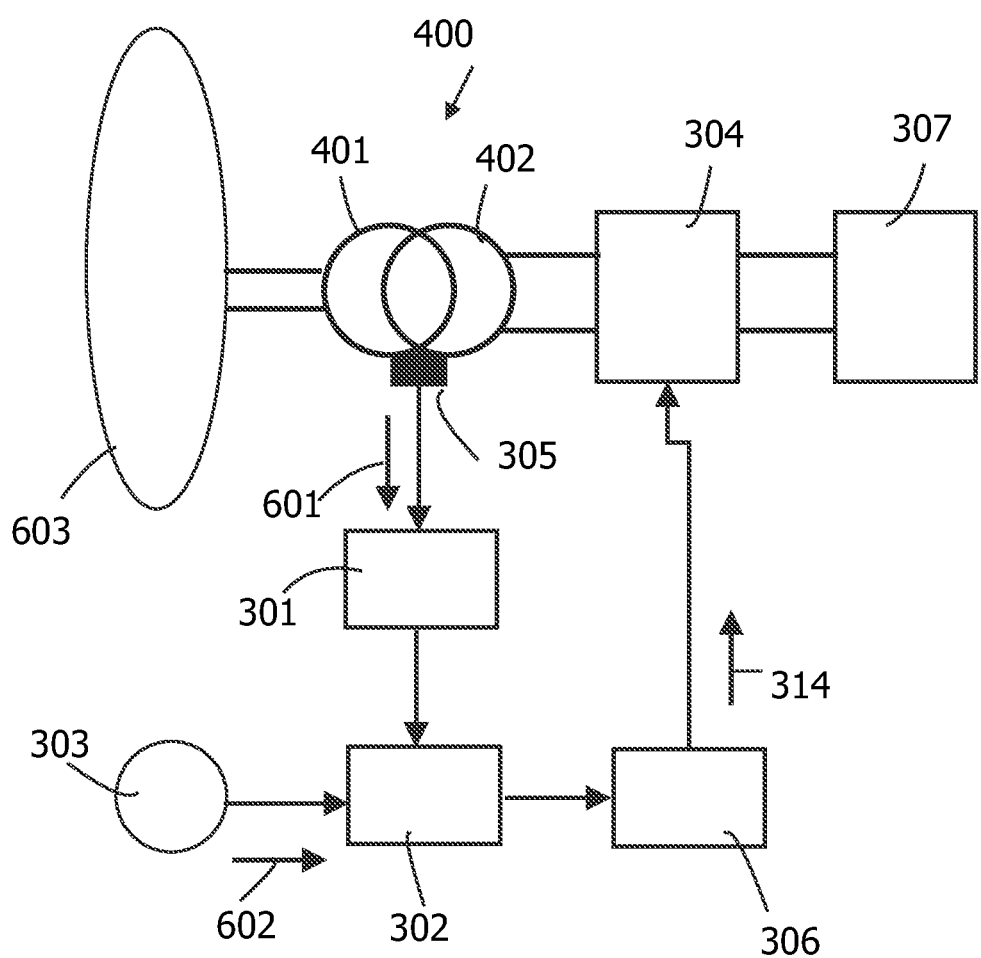
FIG. 3 is a block diagram of an overvoltage clipping device for clipping an overvoltage occurring at a main transformer of a wind turbine, according to a typical embodiment.

FIG. 3 is a block diagram of an overvoltage clipping device 300 according to a typical embodiment. As shown in FIG. 3, an electrical utility grid 603 is connected to a primary winding 401 of an electrical main transformer 400 of a wind turbine. The electrical main transformer 400 further includes at least one secondary winding 402 connected to components of the wind turbine, e.g. to a converter device 307. Between the secondary winding 402 and the converter 307, a switching unit 304 may be provided. The switching unit 304 is part of the overvoltage clipping device 300 and provides an electrical coupling of at least two transformer terminals of the electrical main transformer 400, e.g. an electrical coupling of the secondary transformer terminals of the secondary winding 402.

At the electrical transformer 400, a voltage sensor 305 is provided which is capable of detecting voltages and/or overvoltages 601 present at a primary side or a secondary side of the main transformer 400. A detection unit 301 is capable of detecting the overvoltage 301 such that a detection of an actual voltage level at the main transformer 400 may be provided. Furthermore, a determination unit 302 is operatively connected to the detection unit 301 and is provided for determining whether the actual voltage level, which has been detected by the detection unit 301, is above a predetermined reference voltage level. A predetermined reference voltage level 602 may be provided by a reference voltage generator 303. Thus, the determination unit 302 may compare the detected actual voltage level 601 at the main transformer 400 with the preset reference voltage level 602.

A control unit 306 is operatively connected to the determination unit 302. The control unit 306 outputs a switching signal 314 which is provided for the switching unit 304. Thus, the control unit 306 may drive the switching unit 304, if the detected actual voltage level 601 is above the predetermined reference voltage level 602. On the basis of the switching signal 314, the switching unit 304 is operated such that at least two transformer terminals, such as the transformer terminals connected to the secondary winding 402 at the secondary side of the transformer 400, are electrically coupled by the switching unit 304.

It is noted here that the electrical main transformer 400 is adapted for transforming electrical power generated by a wind turbine generator from a low-voltage region LV to a medium-voltage region MV. Herein, a voltage range for the medium-voltage region MV may be specified from approximately 10 kV to approximately 40 kV, wherein the low-voltage region LV typically ranges from 500 V (volts) to 1000 V, and typically amounts to approximately 690 V. An overvoltage level of an overvoltage 601 to be detected by the voltage sensor 305 in combination with the detection unit 301 may amount to up to 180% of the nominal voltage for a duration of a couple of milliseconds or even longer.

Typically, the switching unit 304 may be operated if the detected actual overvoltage amounts to a voltage level which is 120% of the nominal voltage at the electrical main transformer 400 or above that value. The switching signal 314 is used for triggering the switching unit 304. Moreover, the switching unit 304 may be triggered by the switching signal 314 within a time delay elapsed after a detected overvoltage event. The time delay may be in a range from 0.5 ms (milliseconds) to several seconds. Thus, a point in time when the switching unit 304 is triggered may be based on a comparison of a detected actual voltage level 601 with respect to a predetermined reference voltage level 602 and on applying the switching signal 314 at the switching unit 304. It is noted here that the detection unit 301 for detecting an actual voltage level at the main transformer 400 and/or the determination unit 302 for determining whether the detected actual voltage level is above a predetermined reference voltage level 602 and/or the switching unit 304 for electrically coupling at least two transformer terminals of the main transformer 400 and/or the control unit 306 for driving the switching unit 304 if the detected actual voltage level is above the predetermined reference voltage level (602) may be integrally within a single system device or may be provided as part of the power converter device 307, although not shown in FIG. 3.

Figure 4:
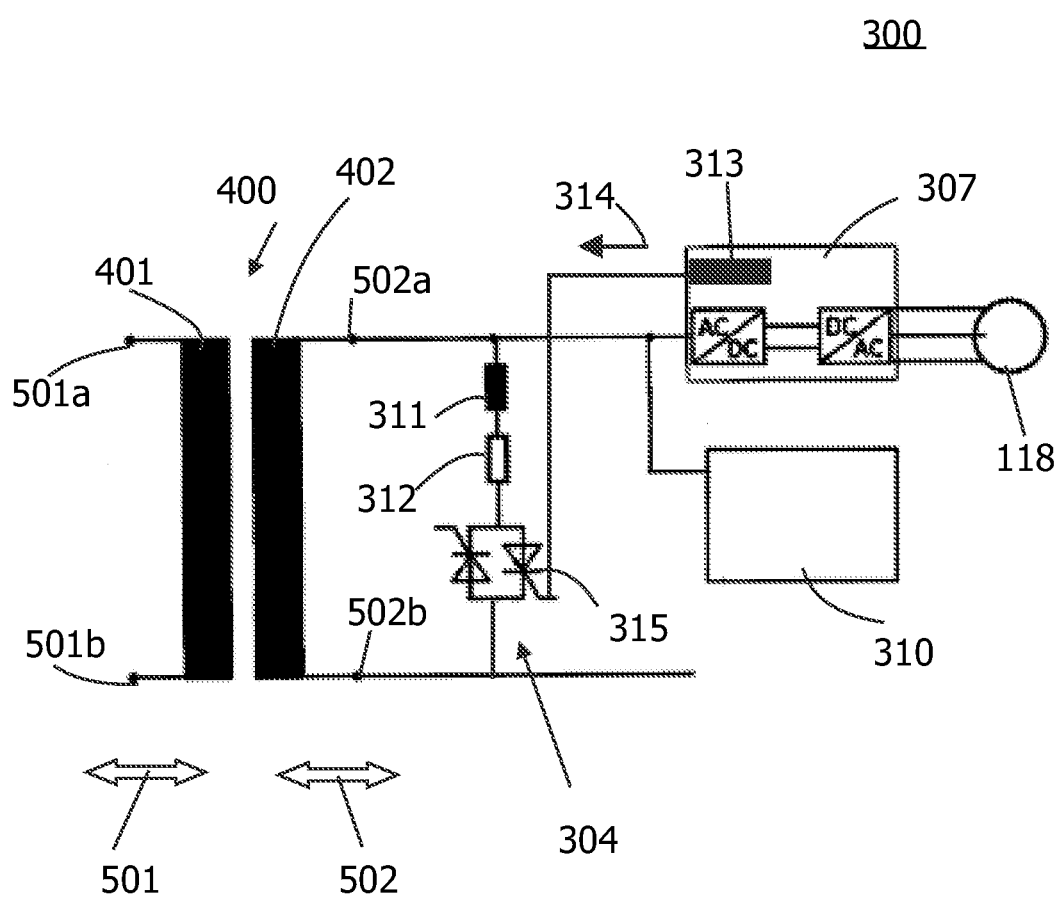
FIG. 4 is a detailed view of an electrical main transformer having at its secondary side an overvoltage clipping device according to another typical embodiment.
Figure 5:
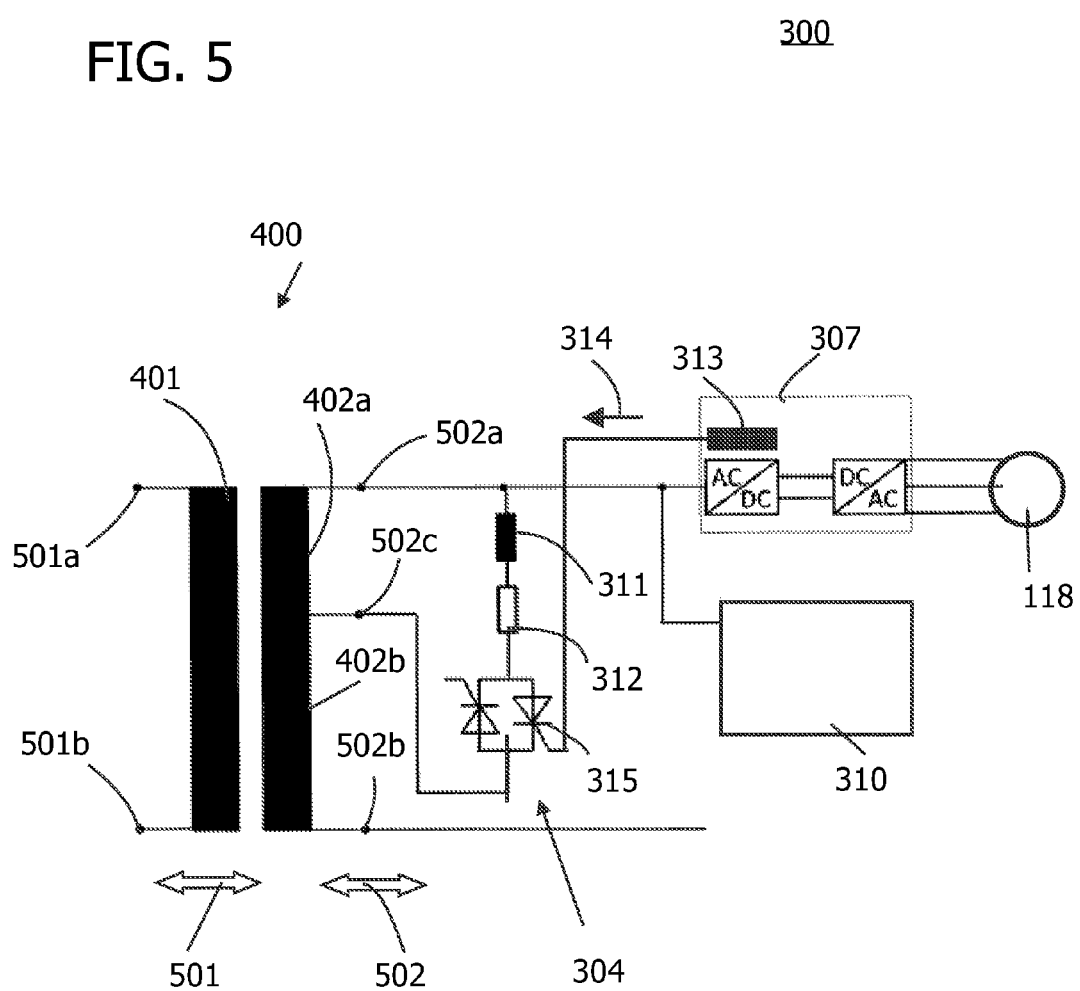
FIG. 5 is a set-up of an electrical main transformer having a switching unit connected between secondary output terminals, according to yet another typical embodiment.

FIG. 4 is a detailed set-up diagram of an overvoltage clipping device 300 according to another typical embodiment. As shown in FIG. 4, the electrical main transformer 400 is a single-phase transformer having a primary winding 401 and a secondary winding 402. According to the embodiment depicted in FIG. 4, which may be combined with other embodiments described herein, a voltage sensor is provided at the converter device 307, i.e. the converter device 307 includes a converter-side sensor 313 for measuring a possible overvoltage event. As shown in FIG. 4, the converter device 307 may provide AC to DC conversion of electrical power generated by the wind turbine generator 118, and DC to AC conversion for applying converted AC power at the secondary winding 402 of the electrical main transformer 400. The switching signal 314 is generated as has been described herein above with respect to FIG. 3. It is noted here that the connection line drawn from the converter-side sensor 313 to the switching unit 304 shown in FIGS. 4 and 5 is used for illustrating that an overvoltage event which has been detected results in a switching signal 314 for triggering the switching unit 304. The switching unit 304 shown in FIG. 4 includes a switching element 315, an inductance element 311 and a resistance element 312 connected in series to each other. The switching element 315 may be selected from the group consisting of a triac, an IGBT, a bipolar transistor, a thyristor, a GTO, a MOSFET, and any combination thereof.

The inductance element 311 is provided as protection for the switching element 315, e.g. a thyristor which switches high short-circuit currents in a range from 10 kA (kilo-Amperes) to 50 kA. Typically, an inductivity of the inductance element is in a range from 5 µH (micro-Henry's) to 40 µH. The resistance element 312 provides a limitation of the maximum short-circuit current and is adapted for receiving the energy such that an overvoltage at the electrical main transformer 400 may be reduced. Typically, an ohmic resistance value of the resistance element is in a range from 10 mΩ (milli-Ohms) to 100 mΩ. A typical energy which may be converted by the resistance element 312 is in a range from 0.5 MWs (mega-Watt-seconds) to 2.5 MWs.

According to another typical embodiment which can be combined with other embodiments described herein, the switching unit 304 may include a copper wire winding instead of the series connection of the inductance element 311 and the resistance element 312. In other words, both an inductivity in a desired range described herein above and an ohmic resistance value in a desired range described herein above may be provided by the copper wire winding which is appropriately designed. The copper wire winding may then be connected in series to the switching element 315. The switching unit 304 including the switching element 315 and a series connection of appropriate inductance and resistance values thus is capable of electrically coupling output terminals of the electrical main transformer 400 at a secondary side 502 when an overvoltage event occurs at a primary side 501. Thus, a first secondary transformer terminal 502a and a second secondary transformer terminal 502b may be electrically coupled to each other such that the short-circuit current may flow via the inductance, the resistance and the switching element 315.

It is noted here, although not shown in FIG. 4, that the switching unit may not only be provided at the secondary side 502 of the electrical main transformer 400 such that the switching unit may electrically couple the at least two secondary transformer terminals 502a and 502b, but the switching unit 304 may also be provided—in addition or alternatively—at the primary side 501 of the electrical main transformer 400, such that the switching unit 304 may electrically couple primary transformer terminals, such as the terminals denoted by reference numerals 501a, 501b in FIG. 4.

It is thus possible, using the switching unit 304 according to a typical embodiment described herein above, to provide low impedance to a line during an overvoltage event. Furthermore, a short circuit on a low-voltage side of the electrical main transformer 400 may be provided. The low impedance is a combination of an inductance element and a resistance element, wherein an overall impedance may be low if high currents flowing through the switching element 304 are provided. Due to switching, a voltage drop at the secondary side 502 of the main transformer 400 shown in FIG. 4 may be provided, such that the terminal voltage of electrical equipment within the wind turbine is reduced by this voltage drop. Thus, it is possible to provide overvoltage protection when overvoltage events are occurring, the overvoltage event lasting several then milliseconds (ms). Thereby, it is possible to protect electrical equipment 310 and power converter device 307, which are connected to a main supply line, by electrically coupling and/or short-circuiting the first and second secondary transformer terminals 502a, 502b.

FIG. 5 is a circuit diagram of an overvoltage clipping device according to yet another typical embodiment which can be combined with other embodiments described herein. As shown in FIG. 5, an electrical main transformer 400 is provided which has three secondary transformer terminals, i.e. a first secondary transformer terminal 502a, a second transformer terminal 502b and a third transformer terminal 502c. The first and third transformer terminals 502a, 502b correspond to the transformer terminals discussed herein above with respect to FIG. 5. The second secondary transformer terminal 502c, however, is provided as an intermediate transformer terminal such that the secondary winding is divided into individual secondary windings, i.e. a first secondary winding 402a and a second secondary winding 402b.

Thus, a voltage applied between first and second secondary transformer terminals 502a, 502c is less as compared to an AC voltage applied between the first and third secondary transformer terminals 502a, 502b, respectively. As shown in FIG. 5, the switching unit 304 including the series connection of the switching element 315, the inductance element 311 and the resistance element 312 is connected between the first secondary transformer terminal 502a and the intermediate (second) secondary transformer terminal 502c. If an overvoltage event is detected, e.g. by means of the converter-side sensor 313 provided at the converter device 307, a switching signal 314 is sent to the switching element 315 such that the first secondary transformer terminal 502a is coupled to the intermediate (second) secondary transformer terminal 502c. Thus, a voltage between the two secondary transformer terminals 502a and 502c is reduced. The reduction in a voltage applied between the first and intermediate secondary transformer terminals 502a, 502c, however, results in a voltage drop between the first and third secondary transformer terminals 502a, 502b as well. Thereby, it is possible to protect electrical equipment 310, which is connected to a main supply line by electrically coupling and/or short-circuiting one of the first and third secondary transformer terminals 502a, 502c to an intermediate secondary transformer terminal 502a.

It is noted here, although not shown in the drawings, that the switching unit 304 may as well be provided at the primary transformer side 501, wherein an intermediate primary transformer terminal may be provided. Thus, sensitive electrical and/or electronic components or electrical equipment connected to the electrical main transformer 400 may be protected against overvoltage events.

Figure 6:
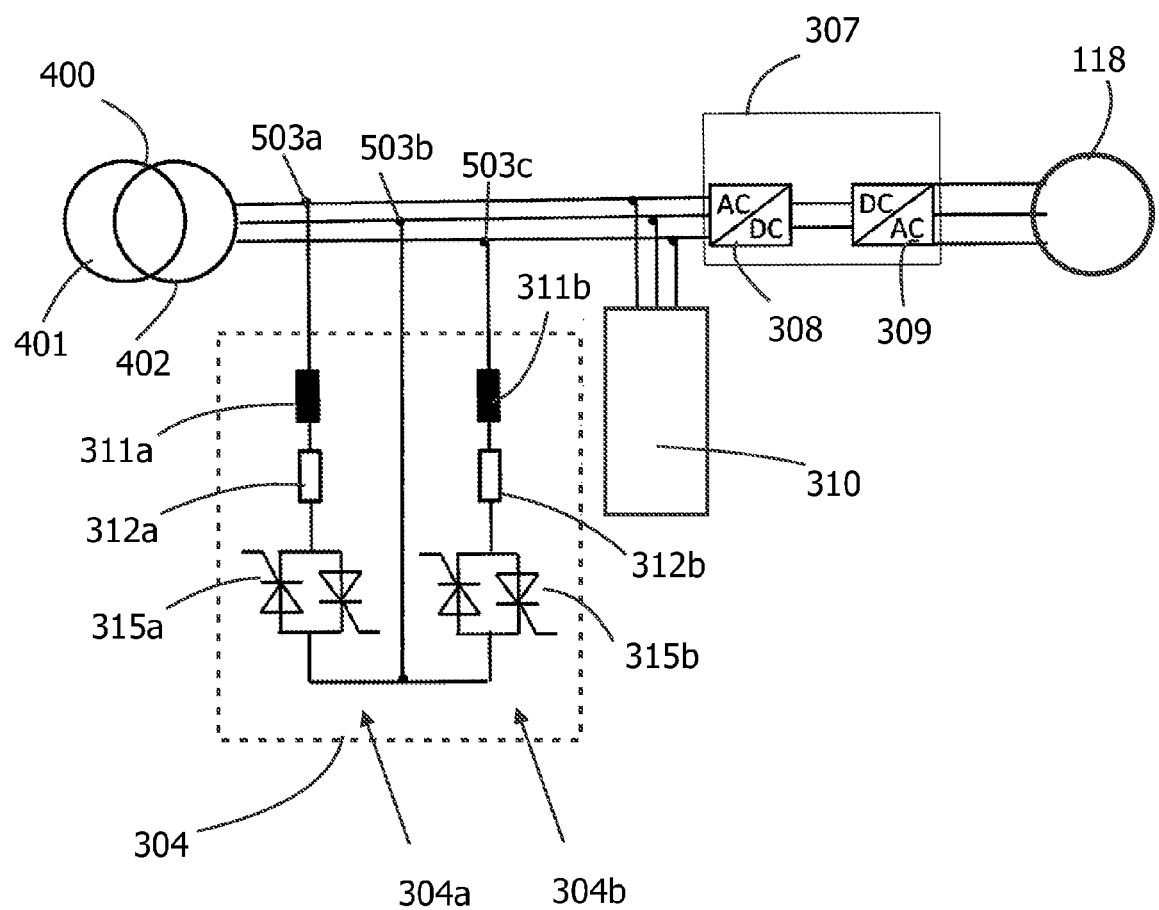
FIG. 6 is a schematic view of an overvoltage clipping device adapted for clipping overvoltages in a three-phase system.

FIG. 6 is an overvoltage clipping device according to yet another typical embodiment. As shown in FIG. 6, a three-phase system is provided. An electrical main transformer 400 having primary windings 401 and secondary windings 402 provides, at its secondary transformer side, three different phase terminals for the three-phase output system, i.e. a first phase terminal 502a, a second phase terminal 503b and a third phase terminal 503c. It is noted here that components which have already been described with respect to previous figures, are not explained again here in order to avoid a redundant description.

The overvoltage clipping device 300 according to a typical embodiment shown in FIG. 6 includes a switching unit 304 which is adapted for electrically coupling all three phases of the three-phase output system. Thereby, the switching unit 304 includes a first portion built up by a series connection of a first switching element 315a, a first resistance element 312a and a first inductance element 311a, and a second portion 304b built up by a series connection of a second switching element 315b, a second resistance element 312b and a second inductance element 311b. As shown in FIG. 6, the first portion 304a of the switching unit 304 is connected between the first phase terminal 503a and the second phase terminal 503b, wherein the second portion 304b of the switching unit 304 is connected between the third phase terminal 503c and the second phase terminal 503b. Thereby, if an overvoltage event is detected by a voltage sensor (not shown in FIG. 6, described herein above with respect to FIGS. 3, 4 and 5), the first and second switching elements 315a, 315b are triggered and provide an electrical coupling of all three phases of the three-phase output system of the electrical main transformer 400.

In other words, the first phase terminal 503a is electrically coupled to the second phase terminal 503b, whereas the third phase terminal 503c is electrically coupled to the second phase terminal 503b. Thus, electrical equipment, such as electrical and/or electronic components connected at the three phases of the three-phase output system, i.e. the electrical equipment 310 shown in FIG. 6, may be protected from overvoltage by means of the overvoltage clipping device 300 of the typical embodiment shown in FIG. 6.

It is noted here, although not shown in the drawings, that other systems except one-phase systems and three-phase systems may be protected by the overvoltage clipping device 300 according to typical embodiments. In other words, electrical systems having two phases or more than three phases may be protected using the overvoltage clipping device 300 by providing an appropriate number of switching units 304, 304a, 304b. It is noted here, however, that for most applications three-phase transformer are used such that a three-phase system may be protected by the overvoltage clipping device 300 according to typical embodiments which may be combined with other embodiments described herein. The switching unit is then provided for all three phases of the three-phase system. Furthermore, or in addition to that, the switching unit 304 may include a first portion built up by a series connection of the first switching element 315a, the first resistance element 312a and the first inductance element 311a, and a second portion 304b built up a the series connection of the second switching element 315b, the second resistance element 312b and the second inductance element 311b, as shown in FIG. 6. Thus, if an overvoltage event is detected the first and second switching elements 315a, 315b may provide an electrical coupling of all three phases of the three-phase system.

Figure 7:
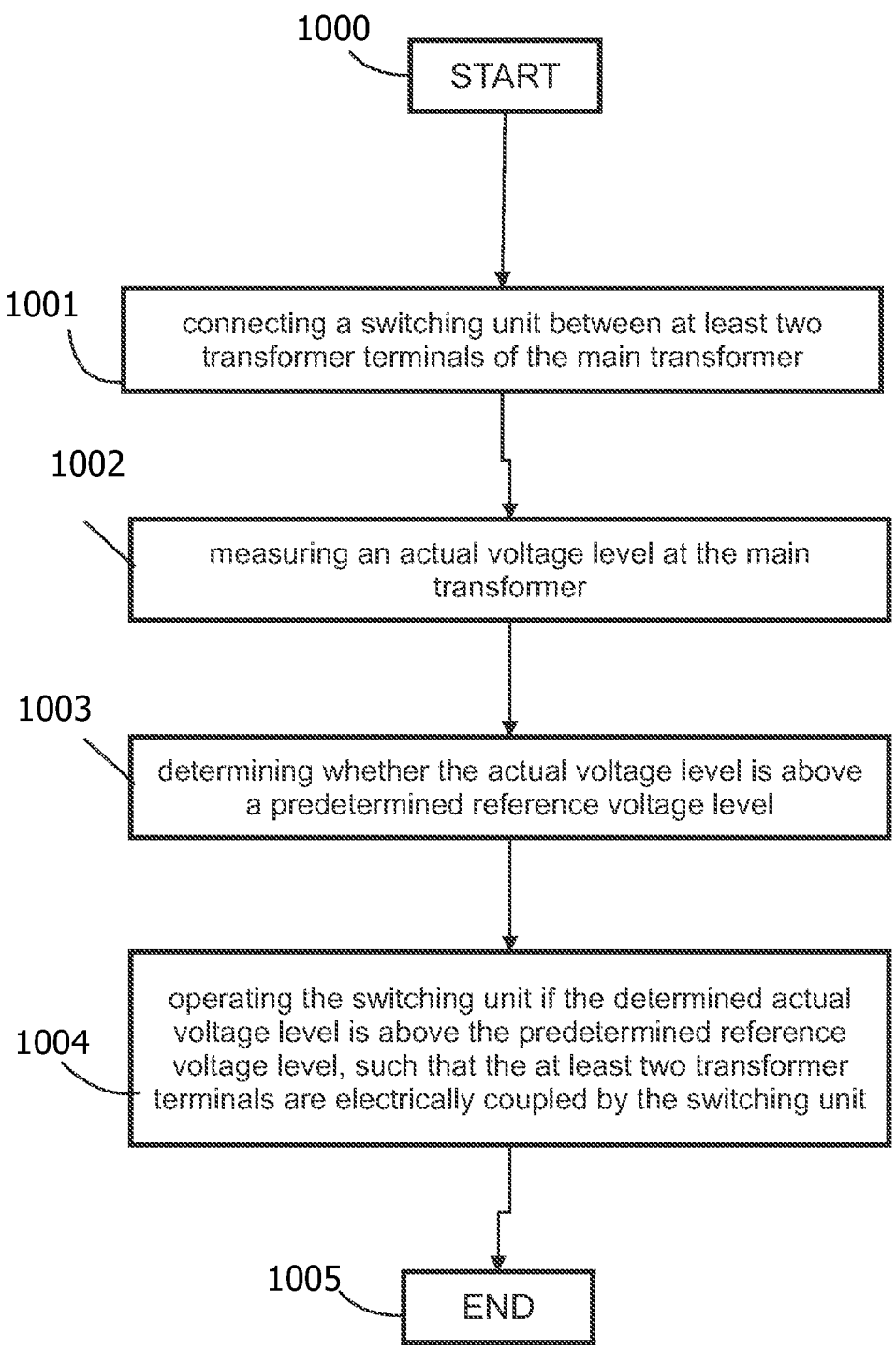
FIG. 7 is a flowchart illustrating a method for protecting a wind turbine connected to a utility grid via a main transformer against overvoltages, according to a typical embodiment.

FIG. 7 is a flowchart for illustrating a method for protecting a wind turbine connected to a utility grid 603 via a main transformer 400. As shown in FIG. 7, after a start of the procedure (block 1000), a switching unit 304 is connected between at least two transformer terminals of the main transformer 400 (block 1001). Then, at a block 1002, an actual voltage level 601 is measured at the main transformer 400. It is determined, at a block 1003, whether the actual voltage level 601, which has been measured at block 1002, is above a predetermined reference voltage level 602. In a block 1004, the switching unit 304 is operated, if the determined actual voltage level 601 is above the predetermined reference voltage level 602 such that the at least two transformer terminals are electrically coupled to each other by the switching unit. It is noted here that operating the switching unit 304 may include providing a short circuit between the at least two transformer terminals. The procedure is ended at a block 1005.

The above-described devices and methods facilitate a secure use of sensitive electrical and/or electronic components, such as electrical equipment in a wind turbine, the wind turbine being connected to a utility grid 603 where overvoltages may occur. The electrical utility grid 603 is connected to electrical equipment 310 of the wind turbine via an electrical main transformer 400. Overvoltages 601 measured at the main transformer and/or the converter device 307 of the wind turbine, are compared to a reference voltage level 602 such that at least two transformer terminals may be electrically coupled to each other and overvoltages 601 are no longer present at electrical equipment 310. Thus, possible damage to electrical and/or electronic components installed within a wind turbine may be avoided or at least reduced.

Exemplary embodiments of devices and methods for protecting a wind turbine against overvoltage are described above in detail. The devices and methods are not limited to the specific embodiments described herein, but rather, components of the devices and/or steps of the methods may be utilized independently and separately from other components and/or steps described herein. Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An overvoltage clipping device for clipping an overvoltage occurring at a main transformer of a wind turbine, the overvoltage clipping device comprising:
    a detection unit for detecting an actual voltage level at the main transformer;
    a determination unit operatively connected to the detection unit for determining whether the detected actual voltage level is above a predetermined reference voltage level; and,
    at least one switching unit operatively connected to the determination unit for electrically coupling at least two transformer terminals of the main transformer to create a high current flow through the main transformer if the detected actual voltage level is above the predetermined reference voltage level, wherein the at least one switching unit comprises:
    a switching element;
    a resistance element coupled in series with the switching element; and
    an inductance element coupled in series with the resistance element;
    wherein one transformer terminal of the at least two transformer terminals is coupled to the switching element and another transformer terminal of the at least two transformer terminals is coupled to the inductance element.

2. The overvoltage clipping device according to claim 1, wherein the switching unit further comprises a control unit operatively connected to the determination unit for driving the switching unit such that the at least two transformer terminals are electrically coupled to each other by the switching unit.

3. The overvoltage clipping device according to claim 1, wherein the switching unit comprises an electrical switching element selected from the group consisting of a triac, an IGBT, a bipolar transistor, a thyristor, a GTO, a MOSFET, and any combination thereof.

4. The overvoltage clipping device according to claim 1, wherein an inductivity of the inductance element is in a range from about 5 µH to about 40 µH.

5. The overvoltage clipping device according to claim 1, wherein an ohmic resistance value of the resistance element is in a range from about 10 mΩ to about 100 mΩ.

6. The overvoltage clipping device according to claim 1, wherein the inductance element and the resistance element are provided by at least one copper wire winding.

7. The overvoltage clipping device according to claim 1, wherein the switching unit is provided at a primary transformer side and is electrically connected between at least two primary transformer terminals.

8. The overvoltage clipping device according to claim 1, wherein the switching unit is provided at a secondary transformer side and is electrically connected between at least two secondary transformer terminals.

9. The overvoltage clipping device according to claim 1, wherein the switching unit is electrically connected between at least one of a secondary transformer terminal and an intermediate transformer terminal at a secondary transformer side.

10. The overvoltage clipping device according to claim 1, wherein the main transformer is a three-phase transformer having a first, a second and a third phase terminal and wherein two switching units are provided for electrically coupling the first phase terminal to the second phase terminal, and the third phase terminal to the second phase terminal, respectively.

11. The overvoltage clipping device according to claim 1, wherein the detection unit for detecting an actual voltage level at the main transformer comprises a voltage sensor.

12. The overvoltage clipping device according to claim 11, wherein the voltage sensor is provided at a converter device of said wind turbine.

13. The overvoltage clipping device of claim 1, wherein the at least one switching unit provides a short circuit on a low voltage side of the main transformer during the overvoltage.

14. A wind turbine, comprising:
    a main transformer connected to a utility grid; and
    an overvoltage clipping device for clipping an overvoltage occurring at the main transformer, the overvoltage clipping device comprising:
    a detection unit for detecting an actual voltage level at the main transformer;
    a determination unit operatively connected to the detection unit for determining whether the actual voltage level is above a predetermined reference voltage level;
    at least one switching unit for electrically coupling at least two transformer terminals of the main transformer; and,
    a control unit operatively connected to the determination unit and for driving the switching unit if the detected actual voltage level is above the predetermined reference voltage level, such that the at least two transformer terminals are electrically coupled to each other by the switching unit, wherein the at least one switching unit comprises:
    a switching element;
    a resistance element coupled in series with the switching element; and
    an inductance element coupled in series with the resistance element; and wherein one transformer terminal of the at least two transformer terminals is coupled to the switching element and another transformer terminal of the at least two transformer terminals is coupled to the inductance element.

15. The wind turbine according to claim 14, wherein the switching unit is provided at a primary side of said main transformer and is electrically connected between at least two primary transformer terminals.

16. The wind turbine according to claim 14, wherein the switching unit is provided at a secondary side of said main transformer and is electrically connected between at least two secondary transformer terminals.

17. A method for protecting a wind turbine connected to a utility grid via a main transformer against overvoltage, the method comprising:
   measuring an actual voltage level at the main transformer;
   determining whether the actual voltage level is above a predetermined reference voltage level; and,
   if the measured actual voltage level is above the predetermined reference voltage level, electrically coupling at least two transformer terminals to each other to create a high current flow through the main transformer and a voltage drop across the main transformer to limit the overvoltage, wherein a switching unit electrically couples the at least two transformer terminals, the switching unit comprising a switching element, a resistance element coupled in series with the switching element, and an inductance element coupled in series with the resistance element, wherein one transformer terminal of the at least two transformer terminals is coupled to the switching element and another transformer terminal of the at least two transformer terminals is coupled to the inductance element.

18. The method according to claim 17, wherein electrically coupling at least two transformer terminals comprises short-circuiting the at least two transformer terminals.

19. The method according to claim 17, wherein electrically coupling at least two transformer terminals is performed within a time delay after a detected overvoltage event, the time delay being in a range from 0.5 milliseconds to several seconds.

20. The method according to claim 17, wherein electrically coupling at least two transformer terminals is performed if the measured actual overvoltage amounts to a voltage level which is at or above 120% of a nominal voltage at the main transformer.

* * * * *